United States Patent [19]
Yagi et al.

[11] Patent Number: 5,273,348
[45] Date of Patent: Dec. 28, 1993

[54] BRAKE CONTROL SYSTEM FOR AUTOMOTIVE VEHICLES

[75] Inventors: Eiji Yagi; Naohiko Inoue; Shoji Shiokawa, all of Kanagawa, Japan

[73] Assignee: Nissan Motor Co., Ltd., Yokohama, Japan

[21] Appl. No.: 869,455

[22] Filed: Apr. 17, 1992

[30] Foreign Application Priority Data

Apr. 23, 1991 [JP] Japan .................................. 3-92038

[51] Int. Cl.[5] .......................... B60T 8/40; B60T 15/36
[52] U.S. Cl. .................................. 303/13; 303/119.2; 303/117.1
[58] Field of Search .................. 251/60, 63.4; 303/13–15, 100, 113.2, 114.1, 116.1, 117.1, 119.2, 10–11, 92, 93, 113.3, 115.1, 115.2, 115.4, 115.5, 116.2, 119.1; 188/358; 60/547.1, 566

[56] References Cited

U.S. PATENT DOCUMENTS 5,163,474  11/1992  Rizk ............................. 303/119.2 X
5,221,126  6/1993   Inoue ........................... 303/13

FOREIGN PATENT DOCUMENTS

62-149543  7/1987  Japan .
4-87867    3/1992  Japan .

Primary Examiner—Robert J. Oberleitner
Assistant Examiner—Josie A. Ballato
Attorney, Agent, or Firm—Foley & Lardner

[57] ABSTRACT

A brake control system for automotive vehicles, comprises a master cylinder, a wheel cylinder, an external hydraulic pressure source for generating an external hydraulic pressure, an electronically controlled hydraulic pressure control valve connected to the external hydraulic pressure source, for converting the external hydraulic pressure to a control pressure, a hydraulic pressure multiplier unit connected to the hydraulic pressure control valve for generating a wheel-cylinder pressure higher than the master-cylinder pressure by multiplying the control pressure, and a spool biasing force restricting mechanism for restricting the magnitude of a spool biasing force created by the master-cylinder pressure to a designated upper limit only when the master-cylinder pressure exceeds a predetermined pressure level sufficient to provide a maximum wheel-cylinder pressure.

8 Claims, 5 Drawing Sheets

BRAKE CONTROL SYSTEM FOR AUTOMOTIVE VEHICLES

BACKGROUND OF THE INVENTION

1. Field of The Invention

The present invention relates to a brake control system which is applied to electronically control automotive brakes, and specifically to an automotive brake control system employing an external brake fluid pressure source for optimally controlling braking for(-e applied to vehicle wheels, irrespective of depressing of a brake pedal.

2. Description of The Prior Disclosure

Recently, there have been proposed and developed various automotive brake control systems associated with at least one of advantageous braking force control systems, namely a traction control system generally abbreviated as a TCS which is provided for suppressing excessive driving force exerted on driven wheels during quick depressing operation of the accelerator pedal, such as quick starting, quick acceleration, or the like, an anti-skid brake control system generally abbreviated as an ABS which is provided for preventing brakes from locking vehicle wheels during quick braking or during braking on a low frictional road surface so as to provide maximum effective braking, and a servo-assisted brake control device which is provided for generating a wheel-cylinder pressure higher than a master-cylinder pressure at a relatively light brake pedal pressure. Such conventional brake control systems have been disclosed in a Japanese First Publication Tokkai (Showa) 62-149543 and a SAE document No. 840468 (Page 3, FIG. 3 indicating a simplified functional diagram with regard to only one controlled wheel) published by a well-known Society of Automotive Engineers.

An automotive brake control system of the former prior art, includes two different fluid pressure control valves disposed between a master-cylinder and a wheel-cylinder, namely a first fluid pressure control valve provided for generating a reasonably increased hydraulic pre&sure higher than a master-cylinder pressure based on the depressing amount of the brake pedal, while receiving both the master-cylinder pressure and a preset external pressure created by an external hydraulic pressure source, and a second pressure control valve provided for generating the sum of the reasonably increased hydraulic pressure fed from the first pressure control valve and the master-cylinder pressure, as a wheel-cylinder pressure. The former prior art can provide the servo-assisted brake control by multiplying the master-cylinder pressure with a designated multiplication factor by means of the first pressure control valve and the traction control by applying a controlled wheel-cylinder pressure to the vehicle wheels through the external hydraulic pressure source even when the brake pedal is not depressed, but not provide the anti-skid brake control since the wheel-cylinder pressure cannot be reduced lower than the master-cylinder pressure, i.e., the wheel-cylinder pressure is held at the master-cylinder pressure value at a minimum.

Alternatively, an automotive brake control system of the latter prior art, includes a ball valve disposed between a master-cylinder and a wheel-cylinder, a pressure-reducing unit associated with the ball valve for applying the master-cylinder pressure through the ball valve to the wheel-cylinder or for reducing the wheel-cylinder pressure to a desirable pressure lower than the master-cylinder pressure through its sliding movement of a stepped piston operably employed in the pressure reducing unit, and a three-position electromagnetic solenoid valve connected to an external hydraulic pressure source for outputting a designated control pressure to the pressure reducing unit so as to close the ball valve and thus prevent application of the master-cylinder pressure to the wheel-cylinder. In brief, the pressure reducing unit serves to apply the master-cylinder pressure to the wheel-cylinder in the absence of the control pressure, and to reduce the wheel-cylinder pressure in the presence of the control pressure. The latter prior art can provide the traction control because of application of external hydraulic pressure created by the external hydraulic pressure source to vehicle wheels, irrespective of depression of the brake pedal, and also provide the anti-skid brake control by increasing or decreasing the wheel-cylinder pressure by means of the pressure reducing unit. However, the latter prior art cannot provide the servo-assisted brake control, since the wheel-cylinder pressure cannot be increased higher than the master-cylinder pressure, i.e., the wheel-cylinder pressure is held at the master-cylinder pressure at a maximum.

Alternatively, Japanese Patent First Publication (Tokkai) Heisei 4-87867, which is assigned by the same assignee as the present invention, discloses an improved construction of an automotive brake control system so as to solve the above noted various problems. The improved construction of the brake control system of the prior art includes an electronically controlled hydraulic pressure control valve through which the previously noted three advantageous braking force controls can be reliably achieved. The hydraulic pressure control valve employs a spool slidably enclosed therein and an electromagnetic solenoid provided in one side of the valve for creating one axial sliding movement of the spool, and a pressure chamber provided in the other side of the valve for creating the opposing axial movement of the spool via a master-cylinder pressure directly introduced into the pressure chamber. In this conventional construction, since one directional spool pushing force created by the solenoid is designed to match the opposing directional spool pushing force created by the master-cylinder pressure, the solenoid is set to a relatively large size depending on a maximum master-cylinder pressure created by the master-cylinder. This results in a relatively large size of the entire brake control system.

SUMMARY OF THE INVENTION

It is therefore, in view of the above disadvantages, an object of the present invention to provide an automotive brake control system which can precisely and reliably achieve three advantageous braking force controls, namely a traction control, an anti-skid brake control, and a servo-assisted brake control with a relatively small size of an electronically controlled pressure control valve having a high durability.

It is another object of the invention to provide an automotive brake control system which can reliably provide a servo-assisted brake controlling operation even when there is a failure in electronic elements associated with a brake controller employed in the brake control system.

It is a further object of the invention to provide an automotive brake control system which can provide a standard braking operational mode wherein a master-cylinder pressure is directly introduced into a wheel-cylinder, even when there is a failure in an external hydraulic pressure source, such as an oil pump, provided in the brake control system so as to provide the above noted three braking force controls.

It is a still further object of the invention to provide an automotive brake control system which can provide an optimal feeling in depressing operation of a brake pedal.

It is another object of the invention to provide an automotive brake control system being capable of achieving the previously noted three brake controls with a high durability and a high responsibility of the brake control.

In order to accomplish the aforementioned and other objects of the invention, an automotive brake control system comprises a master cylinder for generating a master-cylinder pressure depending on a brake-pedal depressing force, a wheel cylinder associated with each vehicle wheel for generating braking force for the vehicle wheel, an external hydraulic pressure source for generating an external hydraulic pressure, an electronically controlled hydraulic pressure control valve connected to the external hydraulic pressure source, for converting the external hydraulic pressure to a control pressure, the hydraulic pressure control valve including a spool slidably enclosed therein for increasing the control pressure via one axial movement thereof and for decreasing the control pressure via the other axial movement thereof, a hydraulic pressure multiplier unit connected to the hydraulic pressure control valve for generating a wheel-cylinder pressure higher than the master-cylinder pressure by multiplying the control pressure, and means for restricting the magnitude of a spool biasing force created by the master-cylinder pressure to a designated upper limit only when the master-cylinder pressure exceeds a predetermined pressure level sufficient to provide a maximum wheel-cylinder pressure. The brake control system also comprises a brake controller for generating a control signal depending on a vehicle driving condition, and an electromagnetic two-position solenoid valve connected to the external hydraulic pressure source and the hydraulic pressure control valve, for providing the one axial movement of the spool in response to the control signal generated during quick acceleration in the absence of the master-cylinder pressure. The brake control system may further comprise a pilot-operated cut-off valve responsive to the control pressure output from the hydraulic pressure control valve, -such that the cut-off valve is held in a closed state in the presence of the control pressure, for preventing the master-cylinder pressure from being directly supplied to the wheel-cylinder and for permitting the multiplied hydraulic pressure created by the multiplier unit to be supplied to the wheel-cylinder, and the cut-off valve is held in a fully open state in the absence of the control pressure, for permitting the master-cylinder pressure to be directly supplied to the wheel-cylinder.

According to one aspect of the invention, a brake control system for automotive vehicles, comprises a master cylinder for generating a master-cylinder pressure depending on a brake-pedal depressing force, a wheel cylinder associated with each vehicle wheel for generating braking force for the vehicle wheel, an external hydraulic pressure source for generating an external hydraulic pressure, an electronically controlled hydraulic pressure control valve connected to the external hydraulic pressure source, for converting the external hydraulic pressure to a control pressure, the hydraulic pressure control valve including a spool slidably enclosed therein for increasing the control pressure via one axial movement thereof and for decreasing the control pressure via the other axial movement thereof, a pressure chamber receiving the master-cylinder pressure for providing the one axial movement by a spool biasing force created by the master-cylinder pressure, and an electronically operated actuator associated with the spool for providing the other axial movement, a hydraulic pressure multiplier unit connected to the hydraulic pressure control valve for generating a wheel-cylinder pressure higher than the master-cylinder pressure by multiplying the control pressure with a designated multiplication factor, and means for restricting the magnitude of the spool biasing force created by the master-cylinder pressure to a designated upper limit only when the master-cylinder pressure exceeds a predetermined pressure level sufficient to provide a maximum wheel-cylinder pressure. The restricting means may include an elastic member, such as a spring, arranged between the spool and a plunger responsive to the master-cylinder pressure for providing the one axial movement of the spool, and a stopper for restricting a maximum stroke of the plunger so as to receive a portion of the spool biasing force created by the master-cylinder pressure higher than the predetermined pressure level. The brake control system may further comprise a piston provided in the hydraulic pressure control valve, for buffering quick application of the master-cylinder pressure onto the plunger by way of an expansion of volumetric capacity of the pressure chamber, and an elastic member attached to a pressure surface of the piston facing the pressure chamber for effectively buffering the quick application of the master-cylinder pressure.

According to another aspect of the invention, a brake control system for automotive vehicles comprises a master cylinder for generating a master-cylinder pressure depending on a brake-pedal depressing force, a wheel cylinder associated with each vehicle wheel for generating braking force for the vehicle wheel, an external hydraulic pressure source for generating an external hydraulic pressure, an electronically controlled hydraulic pressure control valve connected to the external hydraulic pressure source, for converting the external hydraulic pressure to a control pressure, the hydraulic pressure control valve including a spool slidably enclosed therein for increasing the control pressure via one axial movement thereof and for decreasing the control pressure via the other axial movement thereof, a pressure chamber receiving the master-cylinder pressure for providing the one axial movement by a spool biasing force created by the master-cylinder pressure, and an electronically operated actuator associated with the spool for providing the other axial movement, a hydraulic pressure multiplier unit connected to the hydraulic pressure control valve for generating a wheel-cylinder pressure higher than the master-cylinder pressure by multiplying the control pressure with a designated multiplication factor, and means disposed upstream of the hydraulic pressure control valve, for limiting an upper limit of the master-cylinder pressure introduced into the pressure chamber to a designated pressure level. The pressure limiting means may be comprised of a pilot-operated hydraulic pressure shut-off valve which is operated by the master-cylinder pressure serving as a pilot pressure therefor, such that the shut-off valve is held in a fully open state when the master-cylinder pressure is less than a predetermined pressure level and is held in a closed state when the master-cylinder pressure exceeds the predetermined pressure level so as to limit a maximum hydraulic fluid pressure in the pressure chamber at the predetermined pressure level. The brake control system may further comprise a plunger responsive to the master-cylinder pressure for providing the one axial movement of the spool and a metal bellows provided in the pressure chamber in such a manner as to hermetically enclose the plunger, for buffering quick application of the master-cylinder pressure onto the plunger by way of an expansion of volumetric capacity of the pressure chamber.

BEST MODE FOR CARRYING OUT OF THE INVENTION

Figure 1:
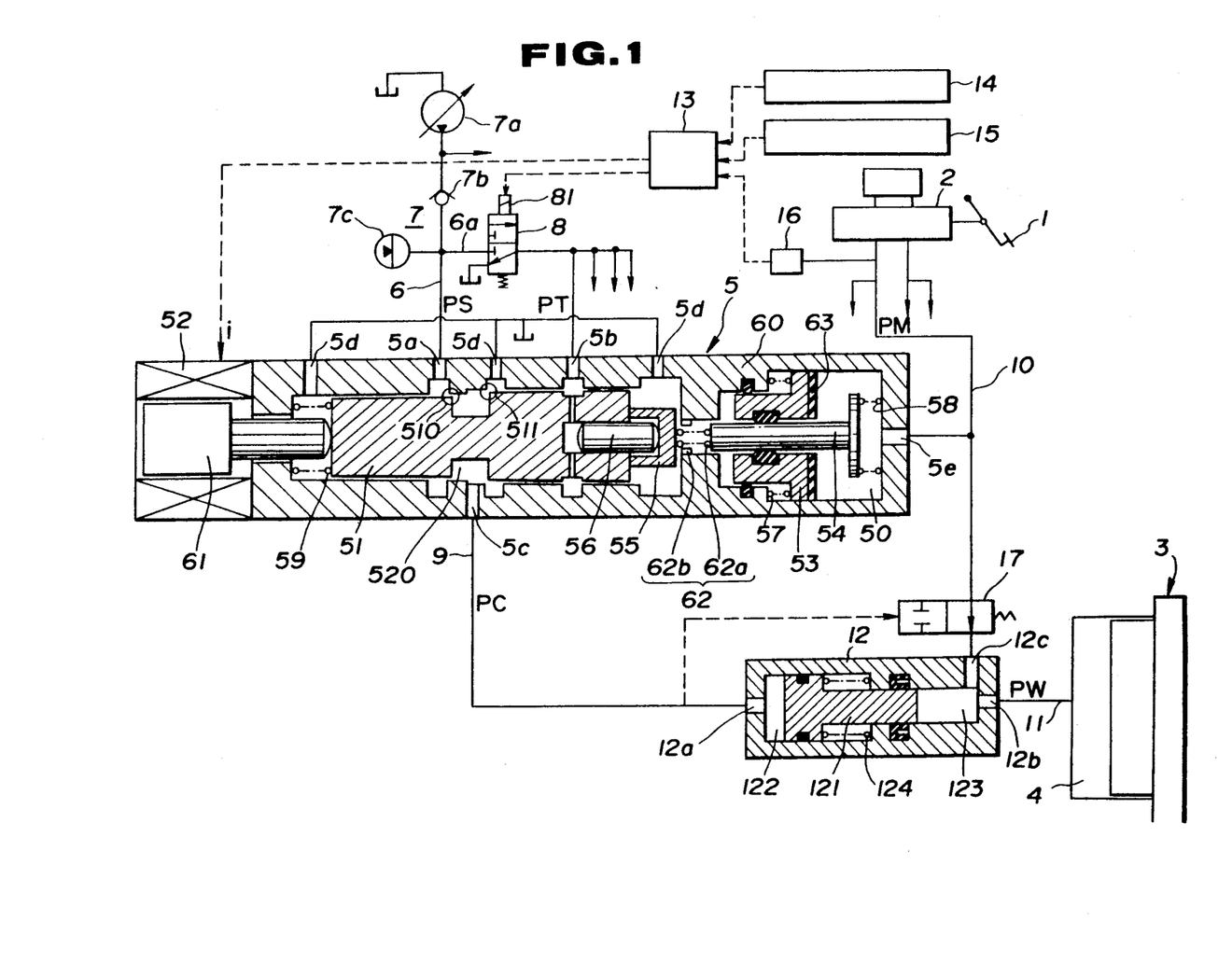
FIG. 1 is a system diagram illustrating a first embodiment of an automotive brake control system according to the invention.

Referring now to the drawings, particularly to FIG. 1, an automotive brake control system of the first embodiment includes a master-cylinder 2 generating a master-cylinder pressure PM based on the magnitude of depressing force applied onto a brake pedal 1, and a wheel-cylinder 4 employed in a braking system 3, such as a disk-brake system so as to apply braking force to each vehicle wheel. The brake control system also includes an electronically controlled hydraulic pressure control valve 5 which employs a valve casing 60, a stepped spool 51 slidably enclosed in the valve casing 60 and an electromagnetic proportioning solenoid 52 having a solenoid plunger 61, an external hydraulic pressure source 7 connected through a line 6 to an inlet port 5a of the hydraulic pressure control valve 5 so as to provide an external hydraulic pressure, an electromagnetic two-position solenoid valve 8 having an electromagnetic solenoid 81, a hydraulic pressure multiplier unit 12 connected through a control pressure supply line 9 to an outlet port 5c of the hydraulic pressure control valve 5 for supplying a wheel-cylinder pressure PW higher than the master-cylinder pressure PM from an outlet port 12b through a wheel-cylinder pressure supply line 11 to the wheel-cylinder 4 by multiplying the incoming hydraulic pressure with a designated multiplication factor, and a pilot-operated cut-off valve 17 receiving the hydraulic pressure output from the outlet port 5c as a pilot pressure. The external hydraulic pressure source 7 is comprised of an oil pump 7a for generating pressurized working fluid, a check valve 7b provided downstream of the oil pump 7a, and a pressure accumulator 7c provided downstream of the check valve 7b for accumulating pressurized working fluid and for generating an accumulator pressure PS. The hydraulic pressure control valve 5 acts to output a control pressure PC from the outlet port 5c through the control pressure supply line 9 to an inlet port 12a of the multiplier unit 12, while receiving both the master-cylinder pressure PM at the inlet port 5e and the accumulator pressure PS at the inlet port 5a. The inlet port of the solenoid valve 8 is connected to the line 6 through a branch line 6a branched therefrom. The pilot-operated cut-off valve 17 acts to prevent the master-cylinder pressure PM from being directly supplied to the wheel-cylinder 4 through a master-cylinder pressure supply line 10 connected to the outlet port of the master-cylinder 2 in the presence of the pilot pressure and to permit the master-cylinder pressure supply in the absence of the pilot pressure. The hydraulic pressure control valve 5 also includes a piston 53 slidably provided in a right inner space axially extending in the valve casing 60 in such a manner as to define a master-cylinder pressure chamber 50 in conjunction with the right end wall of the valve casing 60 (viewing FIG. 1), a plunger 54 which is comprised of a center rod section slidably provided in an inner axial bore of the piston 53 and a substantially disk-shaped head section, a substantially cylindrical seat member 55, a pilot pin 56 slidably inserted in an axially extending right bore defined in the right end of the spool 51, and a transmitted-force restricting mechanism 62 provided between the rod section of the plunger 54 and the seat member 55 so as to restrict a maximum value of force transmitted through the seat member 55 to the spool 51. As seen in FIG. 1, the piston 53 is normally biased by means of a first spring 57. The head section of the plunger 54 is biased leftwards (viewing FIG. 1) by means of a second spring 58 disposed between the head section of the plunger 54 and the rightmost inner wall of the valve casing 60. In the first embodiment, the transmitted-force restricting mechanism 62 is comprised of a resiliently deformable elastic member 62a disposed between the left end of the rod section of the plunger 54 and the right end of the seat member 55 and a stopper 62b restricting a maximum leftward sliding movement of the plunger 54 to a desirable stroke. Reference numeral 63 is an elastic member, such as rubber material, attached to the right end surface of the piston 53 facing the master-cylinder pressure chamber 50. A third spring 59 is provided between the right end wall of the valve casing 60 and the leftmost end of the spool 51 so as to biasing the spool rightwards. The hydraulic pressure control valve 5 also includes a plurality of drain ports 5d each connected to one of fluid-pressure chambers defined by the spool 51 and the inner wall of the valve casing 60, so as to drain working fluid to a hydraulic oil reservoir and an inlet port 5b connected to the outlet port of the solenoid valve 8 so as to receive a traction pressure PT processed through the solenoid valve 8 on the basis of the accumulator pressure PS. The traction control pressure PT acts the left end of the pilot pin 56 and thus reaction force is applied from the left end of the pilot pin 56 onto the right end of the spool 51 in such a manner as to move the spool 51 leftwards. The leftward sliding movement of the spool 51 results in an increase in the wheel-cylinder pressure PW, as described hereinbelow in detail. As previously described, flip hydraulic pressure control valve 5 includes the stepped spool 51. The stepped spool 51 is comprised of two lands, namely a relatively small diameter left land being constantly contact with the right end of the solenoid plunger 61 and a relatively large diameter right land being constantly contact with the left end of the seat member 55. A substantially annular hydraulic pressure chamber 520 is defined between the two lands of the spool 51. As clearly seen in FIG. 1, a substantially annular variable fluid flow passage 510 is defined by the circumferential corner of the right end of the relatively small left land of the spool 51 and the substantially annular land formed on the inner wall of the valve casing 60 for controlling a flow rate of hydraulic fluid with the accumulator pressure PS introduced from the inlet port 5a into the annular hydraulic pressure chamber 520 therethrough depending on an axial position of the spool 51, while a substantially annular variable fluid flow passage 511 is defined by the circumferential corner of the left end of the relatively large right land of the spool 51 and the annular land formed on the inner wall of the valve casing 60 for controlling a flow rate of hydraulic fluid drained from the annular hydraulic pressure chamber 520 through the fluid passage 511 and the drain port 5d to the hydraulic oil reservoir, depending on the axial position of the spool 51. As appreciated from the above, the hydraulic pressure in the pressure chamber 520 is suitably controlled by repeating the rightward and leftward sliding movements of the spool 51, and thus the suitably controlled hydraulic pressure in the pressure chamber 520 functions as a control pressure PC for the hydraulic pressure multiplier unit 12 and as a pilot pressure for the pilot-operated cut-off valve 17.

On the other hand, the multiplier unit 12 has a stepped plunger 121 slidably enclosed in an internal space thereof, a relatively large cylindrical hydraulic fluid pressure chamber 122 defined at the left side of the stepped plunger 121 and a relatively small cylindrical hydraulic fluid pressure chamber 123 defined at the right side of the stepped plunger 121. The plunger 121 is normally biased leftwards by means of a return spring 124.

The brake control system of the invention also includes a controller 13 employing two interfaces, one being an output interface connected to both the exciting coil of the proportioning solenoid 52 and the exciting coil of the solenoid 81, and the other being an input interface connected to various sensors, namely a longitudinal acceleration sensor 14 for monitoring a longitudinal acceleration of the vehicle body, a wheel-speed sensor 15 for monitoring a rotational speed of the vehicle wheel, and a master-cylinder pressure sensor 16 for monitoring the master-cylinder pressure PM. The proportioning solenoid 52 is designed to generate a pushing force FS proportional to the magnitude of the exciting current i output by the controller 13. The pushing force acts to push the spool rightwards by way of the solenoid plunger 61. The two-position solenoid valve 8 is designed to set the port 5b to the drain pressure in the absence of a control signal output from the controller 13 and to set the port 5b to the traction control pressure PT in the presence of the the control signal.

The pilot-operated cut-off valve 17 is connected to the master-cylinder pressure supply line 10 at the inlet port, and to an inlet port 12c of the multiplier unit 12 at the outlet port.

With the above noted arrangement, the brake control system of the first embodiment is operated as follows.

When the braking operation is in an inoperative state, i.e., the brake pedal 1 is not depressed and as a result the master-cylinder pressure PM is equivalent to 0, and in addition the inlet port 5b is set to the drain pressure, a series of axially slidable members which are constructed by the spool 51, the seat member 55, the elastic member 62a of the transmitted-force restricting mechanism 62, and the plunger 54 arranged in series to each other, are held in a position wherein a rightward biasing force, namely the pushing force FS and the spring force F1 caused by the spring 59 both acting to move the spool 51 rightwards, is balanced to a leftward biasing force, namely the spring force F2 caused by the spring 58, i.e., an equation (FS+F1=F2) is satisfied. Under this condition, when the brake pedal 1 is depressed and thus the master-cylinder 2 generates the master-cylinder pressure PM increased in accordance with the increase in the depressing force. In such a brake-pedal depressed state, in addition to the above noted balanced forces, there is an additional leftward biasing force A4·PM derived by multiplying the cross sectional area A4 of the axially extending rod section of the plunger 54 by the master-cylinder pressure PM. In other words, the spool 51 is moved leftwards from the previously noted balanced position so as to satisfy an equation (FS+F1)=(F2+A4·PM). Therefore, the fluid flow passage area of the fluid flow passage 510 is increased in accordance with the leftward sliding movement of the spool 51, while the fluid flow passage area of the fluid flow passage 511 is decreased, with the result that the control pressure PC created in the pressure chamber 520 is gradually increased and thus held at a relatively high level of fluid pressure. The relatively high control pressure PC acts as a rightward biasing force of the spool 51 to move the spool 51 rightwards due to the difference (A1−A2) between the fluid flow passage areas of the two lands of the spool, namely the relatively large diameter right land having a lateral cross-sectional area A1 and the relatively small diameter left land having a lateral cross-sectional area A2. At this time, the balance relationship between biasing forces acting onto the spool 51 is represented by the following equation.

$$(A1-A2)PC+F1=F2+A4\cdot PM$$

wherein the right side ((A1−A2)+F1) of the equation corresponds to the rightward biasing force acting on the spool 51, while the left side (F2+A4·PM) corresponds to the leftward biasing force acting on the spool 51.

As appreciated from the above equation, the control pressure PC is in proportion to the magnitude of the master-cylinder pressure PM, during normal braking operation.

Thereafter, when the exciting current i is applied from the controller 13 to the proportioning solenoid 52, the solenoid 52 applies the spool pushing force FS proportional to the magnitude of the current i onto the spool 51 to move the spool 51 rightwards. Under this condition, the balance relationship of biasing forces acting to the spool 51 is the following equation.

$$(A1-A2)\cdot PC+F1+FS=F2+A4\cdot PM$$

Through transposition of terms of the above equation, the equation could be further represented by the following equation.

$$(A1-A2)\cdot PC=A4\cdot PM+F2-F1-FS$$

As appreciated from the above equation, the control pressure PC is not only increased in proportion to the increase in the master-cylinder pressure PM but also decreased in proportion to the increase in the spool pushing force FS, i.e. the magnitude of exciting current i applied to the solenoid 52. Assuming that the master-cylinder pressure PM is held constantly, the control pressure PC is varied depending on the magnitude of exciting current i, in a manner so as to be increased when the magnitude of exciting current is decreased, and to be decreased when the magnitude of exciting current is increased.

In the presence of the control pressure PC during braking operation, the pilot-operated cut-off valve 17 is switched from a fully open position to a closed position in response to the control pressure serving as a pilot pressure, so as to prevent the master-cylinder pressure PM from being introduced through the inlet port 12c, the right pressure chamber 123 and the line 11 to the wheel-cylinder 4. Therefore, only the control pressure PC is supplied from the outlet port 5c of the hydraulic pressure control valve 5 through the inlet port 12a to the left pressure chamber 122. As a result, the stepped plunger 121 of the multiplier unit 12 is moved rightwards to pressurize the hydraulic fluid in the right pressure chamber 123, thereby resulting in an increase in the wheel-cylinder pressure PW. The incoming control pressure PC in the left pressure chamber 122 is multiplied by a ratio A5/A6 of a lateral cross-sectional area A5 of the large diameter section of the plunger 121 to a lateral cross-sectional area A6 of the small diameter section of the plunger 121 by way of the stepped plunger 121 and thus the increased hydraulic fluid pressure in the right pressure chamber 123 is applied to the wheel-cylinder 4, as a wheel-cylinder pressure PW.

As set forth above, in the presence of the control pressure PC during braking operation, the wheel-cylinder pressure PW is represented by the following formula, since the control pressure is represented by the formula $PC=(A4 \cdot PM+F2-F1-FS)/(A1-A2)$.

$$PW=(A5/A6)PC=\{A5(A4 \cdot PM+F2-F1-FS)\}/\{A6 \cdot (A1-A2)\}$$

Figure 2:
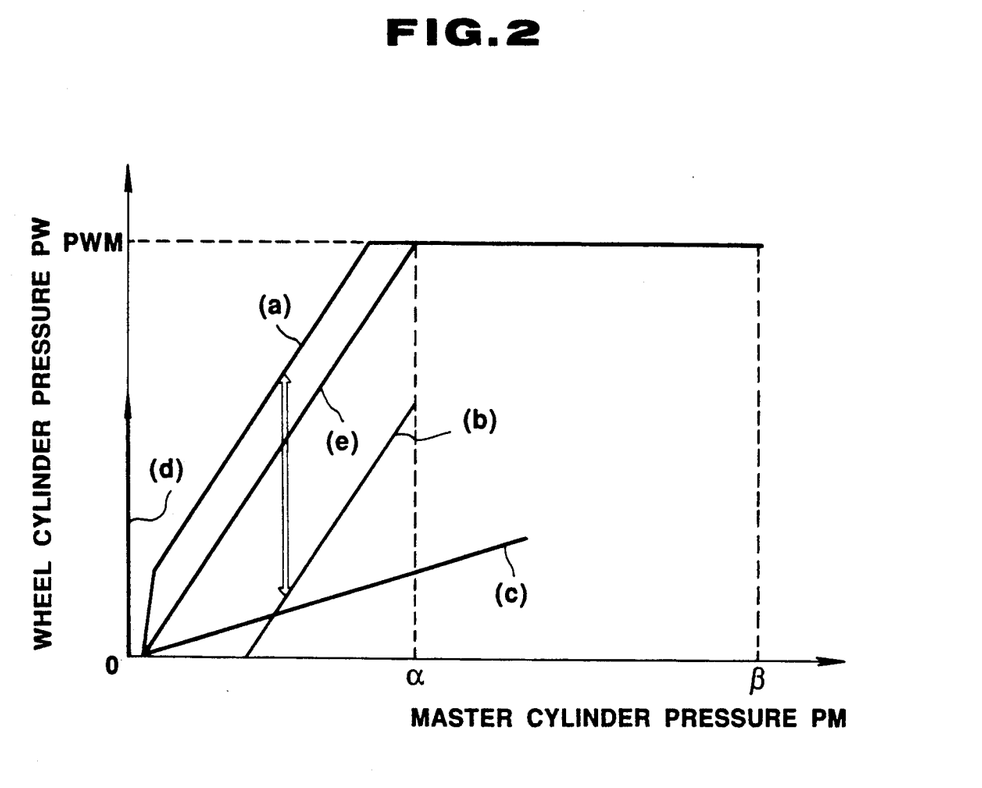
FIG. 2 is a graph illustrating a pressure relationship between a master-cylinder pressure and a wheel-cylinder controlled according to the brake control system of the first embodiment.

The formula represents the pressure relationship of the wheel-cylinder pressure PW relative to the master-cylinder pressure PM, as clearly shown in graphs (a), (e), and (b) of FIG. 2. Assuming that the solenoid current i is gradually decreased towards zero, the graph representative of the pressure relationship of PW to PM approaches to the uppermost graph (a). To the contrary, assuming that the solenoid current i is gradually increased to a maximum value, the pressure relationship of PW to PM approaches to the lowermost graph (b). That is, the graphs (a) through (b) represent hydraulic pressure multiplying characteristics of the brake control system of the first embodiment. When the solenoid current i is zero, the master-cylinder pressure PM is multiplied with a maximum multiplication factor as shown in the graph (a) of FIG. 2. Therefore, supposing that a plurality of hydraulic pressure multiplying characteristics representative of the pressure relationship of the wheel-cylinder pressure PW relative to the master-cylinder pressure PM are preset in memories of the controller 13 in the form of a data map, based on various vehicle driving conditions, the controller 13 can select an optimal hydraulic pressure multiplying characteristic by controlling the magnitude of the solenoid current i on the basis of the vehicle driving condition determined by input information provided through signals from the longitudinal acceleration sensor 14 and the wheel speed sensor 15 and the master-cylinder pressure value monitored by the pressure sensor 16. In this manner, the brake control system according to the invention can achieve a reasonably suitable servo-assisted brake control with an optimal hydraulic pressure multiplying characteristic depending on the vehicle driving condition.

When there is a possibility of wheel-lock during quick braking or during braking on a low frictional road surface, an ABS employed in the controller 13 controls to increase and decrease the magnitude of the solenoid current i applied to the solenoid 52. Assuming that a normal hydraulic pressure multiplying characteristic is set to the characteristic indicated by the graph (e) during the anti-skid brake control, the pressure relationship of the wheel-cylinder pressure PW to the master-cylinder pressure PM can be properly varied within a particular range defined by the maximum hydraulic pressure multiplying characteristic (a) and the minimum hydraulic pressure multiplying characteristic (b). First, the controller 13 derives a slip ratio on the basis of the wheel speed monitored by the wheel-speed sensor 15 and the vehicle speed obtained by integrating a longitudinal acceleration of the vehicle body monitored by the longitudinal acceleration sensor 14. Thereafter, the controller 13 controls the magnitude of solenoid current i to increase or decrease or hold the wheel-cylinder pressure PW such that the slip ratio is maintained within a desired acceptable slip-ratio range. In this manner, when the ABS comes into operation, the ABS effectively prevents an undesirable wheel-lock during quick braking or during braking on a low-frictional road, while providing reasonably high braking force. According to an anti-skid brake control achieved by the controller 13 of the first embodiment, maximum braking effect is obtained, since the wheel-cylinder pressure PW is varied within a sufficiently wide pressure range defined by the graphs (a) and (b).

When there is a possibility of a wheel-spin due to an excessively high driving force exerted on driven wheels during quick depressing operation of an acceleration pedal, such as quick starting or quick acceleration, a TCS employed in the controller 13 operates to shift the solenoid valve 8 from an OFF state to an ON state and to generate an exciting current i for the solenoid 52 so as to suppress slip of driven wheels. At this time, the master-cylinder pressure is equal to zero, since the brake pedal is not depressed but the accelerator pedal is quickly depressed. When the solenoid valve 8 is activated during the traction control, the solenoid valve is opened to supply the accumulator pressure PS serving as the traction control pressure PT to the outlet port 5b of the hydraulic pressure control valve 5. The traction control pressure PT acts to the pilot pin 56 and thus the spool 51 is moved leftwards. The balance relationship between biasing forces acting to the spool 51 is represented by the following equation.

$$(A1-A2)PC=A3 \cdot PT-F1-FS$$

wherein A3 designates a lateral cross-sectional area of the pilot pin 56.

As appreciated from the above equation, even though the master-cylinder pressure PM is not created, the control pressure PC is variably controlled depending on the magnitude of the solenoid current i within a particular pressure range (as indicated by the graph (d) of FIG. 2) defined by a maximum pressure based on the magnitude of the traction control pressure PT in a deactivated state of the solenoid 52 wherein the solenoid current i is zero and a minimum pressure based on the magnitude of the traction control pressure PT when the solenoid current reaches a maximum current value. In other words, braking force is suitably applied to driven wheels without creating the master-cylinder pressure PM in response to the slippage occurring at the driven wheels such that the slippage is suppressed to a minimum.

When there is a failure in electronic elements associated with the brake controller 13, such as a failure in at least one of sensors 14, 15 and 16, the controller 13 does not output control signals to the solenoids 52 and 81 and therefore both solenoids are deactivated, and therefore the solenoid current i to be applied to the solenoid 52 is zero and the solenoid valve 8 is held in a closed state. In this case, there are rightward biasing forces $(A1-A2)PC$ and F1 both acting to move the spool 51 rightwards and leftward biasing forces $A4 \cdot PM$ and F2 both acting to move the spool 51 leftwards. Therefore, the balance relationship between the biasing forces is represented by the following equation.

$$(A1-A2)PC = A4 \cdot PM + F2 - F1$$

Therefore, the wheel-cylinder pressure PW is represented by the following equation.

$$PW = (A5/A6)PC = \{A5(A4 \cdot PM + F2 - F1)\}/\{A6 \cdot (A1 - A2)\}$$

As appreciated from the above equation, the wheel-cylinder pressure PW is varied in accordance with only the graph (a) of FIG. 2 representative of the maximum hydraulic pressure multiplying characteristic. During failure in electronic elements associated with the controller 13, the brake control system of the first embodiment does not provide both an anti-skid brake control and a traction control since the solenoid current i is held at zero, but insure a servo-assisted brake control with the maximum hydraulic pressure multiplying characteristic (a).

In the absence of the accumulator pressure PS due to a failure in the external hydraulic pressure source 7, such as a failure in the oil pump 7a, the control pressure PC cannot be created, i.e., the pressure PC is held at zero, since the accumulator pressure PS is zero. In the absence of the control pressure PC, the pilot-operated cut-off valve 17 is deactivated and held in a fully open state. As a result, the valve 17 establishes fluid communication between the master-cylinder pressure supply line 10 and the inlet port 12c of the multiplier unit 12. Therefore, the master-cylinder pressure PM is directly introduced into the wheel-cylinder 4 as a wheel-cylinder pressure PW. In the absence of a failure in the external hydraulic pressure source 7, the brake control system of the first embodiment operates to insure a standard braking action in accordance with the pressure characteristic of the wheel-cylinder pressure PW in relation to the master-cylinder pressure PM, as indicated by graph (c) of FIG. 2. As set forth above, the brake control system of the first embodiment can provide an adequate fail-safe for a braking system.

Furthermore, since the hydraulic pressure control valve 5 employs the piston 53 slidably enclosed therein for buffering quick application of the master-cylinder pressure PM onto the plunger 54 by way of a slight expansion of volumetric capacity of the pressure chamber 50 and the elastic member 63 attached to the right end surface of the piston 53 facing the master-cylinder pressure chamber 50, more of brake fluid flow output from the master-cylinder can be mainly absorbed by way of both elastic deformation of the elastic member 63 and leftward axial sliding movement of the piston 53 when the driver starts to depress the brake pedal I during a standard braking, because the spool 51 merely experiences a slight axial sliding movement and the wheel-cylinder 4 and a wheel-cylinder piston (not shown) slidably enclosed in the wheel-cylinder 4 merely experiences a slight sliding movement for a moment until the pilot-operated cut-off valve 17 is held in a closed state by the controller 13. This results in an optimal feeling in depressing operation of a brake pedal.

The hydraulic pressure multiplying characteristic of the brake control system of the preferred embodiment is set to a standard hydraulic pressure multiplying characteristic indicated in the graph (e) of FIG. 2, based on a standard vehicle driving condition, such as a constant speed travelling on dry pavement. In order to keep the standard hydraulic pressure multiplying characteristic (e), the solenoid 52 i,-3 activated with a relatively small solenoid current i so as to provide a slight spool pushing force FS. As appreciated from the standard hydraulic pressure multiplying characteristic (e), the brake control system is designed to provide a desirable maximum wheel-cylinder pressure PWM when the master-cylinder pressure PM reaches a particular pressure $\alpha$. Actually, the master-cylinder 2 is designed to provide a master-cylinder pressure $\beta$ greater than the pressure $\alpha$ so as to assure the provision of the maximum wheel-cylinder pressure PWM. As previously described, since the wheel-cylinder pressure PW is represented by the equation $PW = \{A5(A4 \cdot PM + F2 - F1 - FS)\}/\{A6 \cdot (A1-A2)\}$, the maximum wheel-cylinder pressure PWM is represented by the following equation.

$$PWM = \{A5(A4 \cdot \beta + F2 - F1 - FSM)\}/\{A6 \cdot (A1-A2)\}$$

wherein FSM corresponds to a maximum spool pushing force generated by the solenoid 52.

Note that the greater the maximum master-cylinder pressure $\beta$ becomes, the greater the maximum spool pushing force of the solenoid 52 must become, because the upper limit PWM of the wheel-cylinder pressure PW is preset to a designated constant value.

As previously described in the Prior Disclosure, the Japanese Patent First Publication (Tokkai) Heisei 4-87867, which is assigned by the same assignee as the present invention, teaches the construction of the brake control system substantially similar to the first embodiment of FIG. 1. However, the brake control system of the Japanese Patent First Publication Heisei 4-87867 does not include the transmitted-force restricting mechanism 62 of the first embodiment of the present invention. For this reason, the above conventional brake control system requires a relatively large solenoid unit employed in an electronically controlled hydraulic pressure control valve, so as to generate a relatively great spool pushing force acting to move a spool operably enclosed in the hydraulic pressure control valve rightwards, against the maximum master-cylinder pressure $\beta$ serving as a leftward biasing force for the spool.

Figure 3:
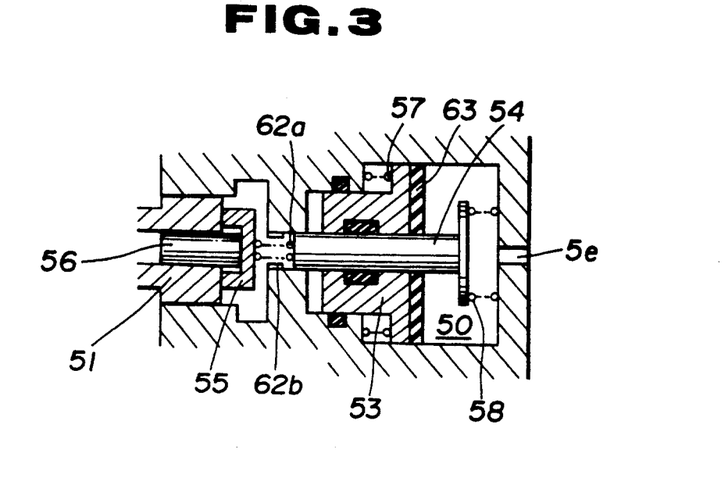
FIGS. 3, 4 and 5 are partial sectional views illustrating an operation of an essential portion of the first embodiment.
Figure 4:
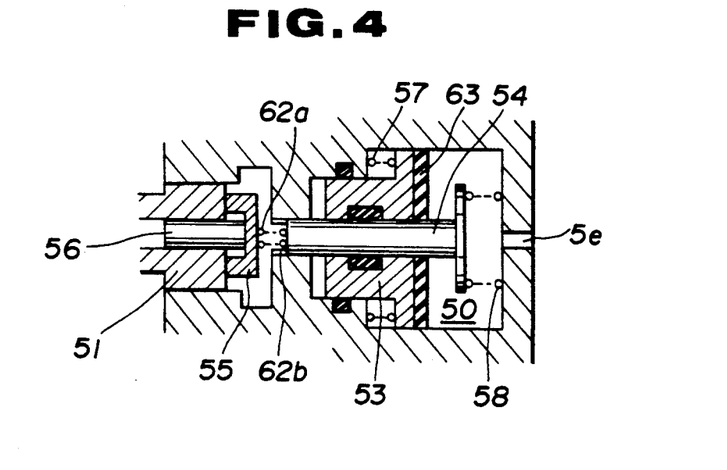
Figure 5:
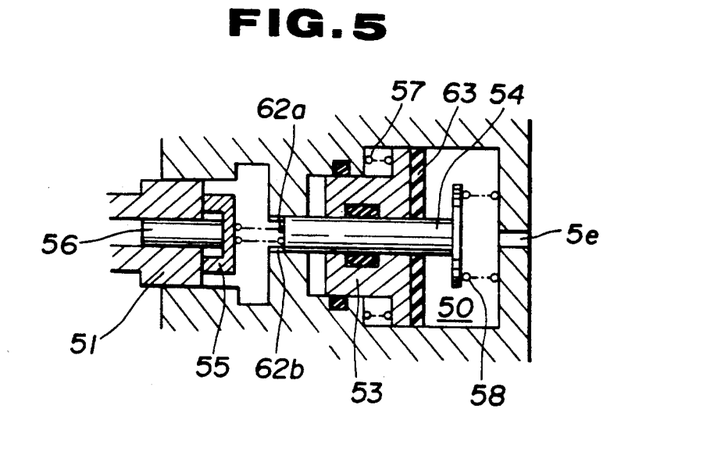

Alternatively, since the brake control system according to the invention includes the transmitted-force restricting mechanism 62, when the position of the plunger 54 is shifted from a first state (corresponding to FIG. 3) wherein the master-cylinder pressure PM does not reach the pressure $\alpha$ to a second state (corresponding to FIG. 4) wherein the master-cylinder pressure PM exceeds the pressure $\alpha$ or to a third state (corresponding to FIG. 5) wherein the master-cylinder pressure PM exceeds the pressure $\alpha$ and additionally the spool 51 is shifted leftwards according to the traction control, for example, the upper limit of the leftward biasing force created depending on the magnitude of the master-cylinder pressure PM is restricted by the transmitted-force restricting mechanism 62 such that the left end of the plunger rod abuts the stopper 62b as seen in FIG. 4. Therefore, in the first embodiment of the invention, the maximum spool pushing force FSM of the solenoid 52 can be set to match to a desirable minimum value $\alpha$ of the master-cylinder pressure PM enough to provide a maximum wheel-cylinder pressure PWM. As appreciated from the above, the brake control system according to the invention can reliably and precisely provide three brake controls, namely a servo-assisted brake control, an anti-skid brake control and a traction control, with a relatively small size of an electronically controlled hydraulic pressure control valve. According to the invention, the maximum wheel-cylinder pressure PWM is represented by the following equation.

$$PWM = \{A5(A4 \cdot \alpha + F2 - F1 - FSM)\}/\{A6 \cdot (A1 - A2)\}$$

Assuming that the two spring forces F1 and F2 are equal to each other, i.e., F1=F2, the maximum spool pushing force FSM is represented by the following formula.

$$FSM = \alpha \cdot A4 - A6(A1 - A2) \cdot PWM/A5$$

As set forth above, the maximum spool pushing force FSM corresponds to a maximum solenoid force created by the solenoid 52 when the transmitted-force restricting mechanism 62 is provided. Conversely, when the transmitted-force restricting mechanism 62 is not provided, the maximum force FSM is represented by the following formula.

$$FSM = \beta \cdot A4 - A6(A1 - A2) \cdot PWM/A5$$

As appreciated from the above two formulae with regard to the maximum spool pushing force FSM, in the presence of the transmitted-force restricting mechanism 62, the maximum force FSM could be decreased at a ratio of $\alpha/\beta$, so as to minimize a size of the solenoid 52.

Figure 6:
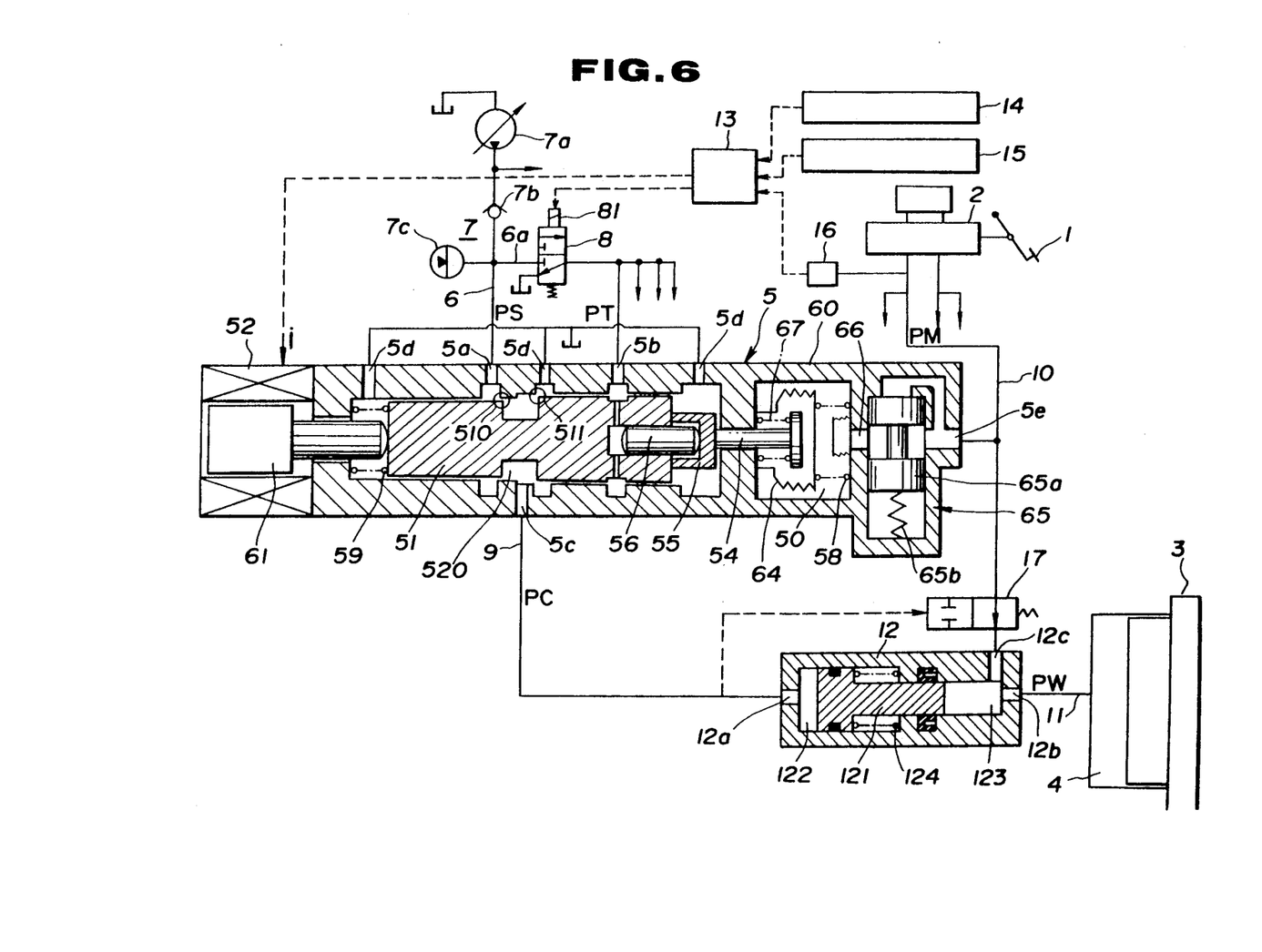
FIG. 6 is a system diagram illustrating a second embodiment of an automotive brake control system according to the invention.

Referring now to FIG. 6, there is shown a brake control system of the second embodiment. Since the construction of the brake control system of the second embodiment is basically similar to that of the first embodiment, the same reference numerals used in the first embodiment shown in FIG. 1 will be applied to the corresponding elements used in the second embodiment shown in FIG. 6, for the purpose of simplification of description. The brake control system of the second embodiment is different from the first embodiment in that a metal bellows 64 is provided in the pressure chamber 50 while being biased in the leftward direction by means of the spring 58 and the head section of the plunger 54 is enclosed in the metal bellows 64 while being biased in the rightward direction (viewing FIG. 6) by means of a return spring 67 and in addition a pilot-operated hydraulic pressure shut-off valve 65 is arranged at the rightmost end of the electronically controlled hydraulic pressure control valve 5 for limiting an upper limit of the master-cylinder pressure PM supplied to the master-cylinder pressure chamber 50 to a designated pressure level.

The hydraulic pressure shut-off valve 65 includes a radially extending spool 65a slidably enclosed in the right side of the valve casing and a spring 65b provided for normally biasing the spool 65a in the upward direction (viewing FIG. 6). The spool 65a of the hydraulic pressure shut-off valve 65 is operated by the master-cylinder pressure serving as a pilot pressure therefor. The above noted designated pressure level is determined depending upon a spring constant of the spring 65b. When the valve 65 is in a fully open state, the master-cylinder pressure PM is directly introduced through a communication passage 66 to the pressure chamber 50. The operation of the valve 65 will be hereinbelow described in detail.

Figure 7:
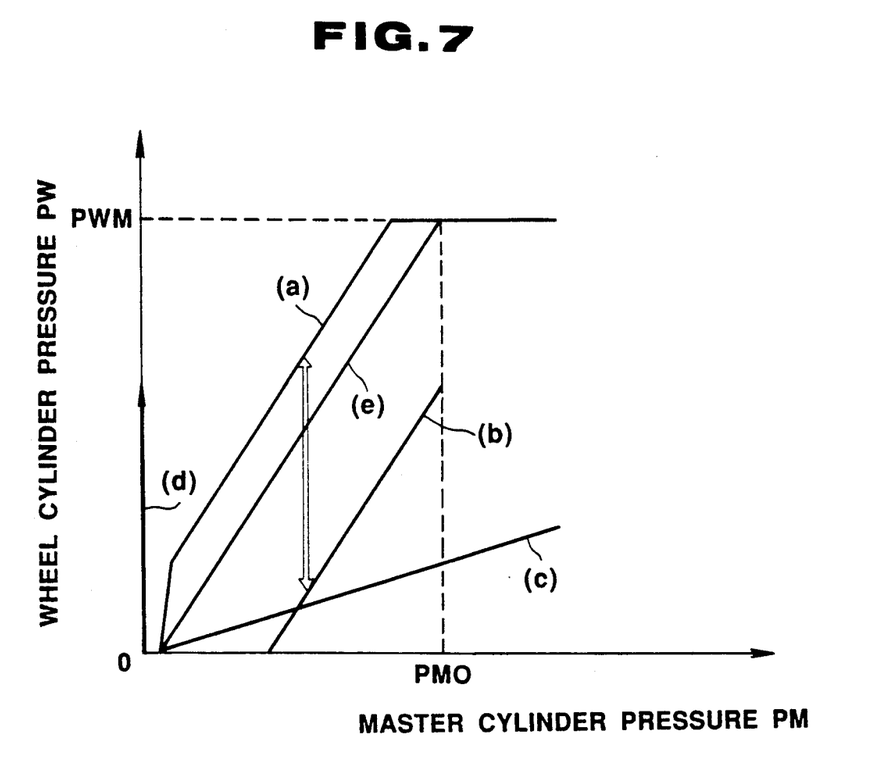
FIG. 7 is a graph illustrating a pressure relationship between a master-cylinder pressure and a wheel-cylinder pressure controlled according to the brake control system of the second embodiment.

When the upwardly biasing force created by the spring 65b exceeds the downwardly biasing force created by the master-cylinder pressure PM acting to the upper end of the spool 65a, i.e., the master-cylinder pressure PM is less than a predetermined pressure level PMO as shown in FIG. 7, the spool 65a is held in an uppermost position as shown in FIG. 6, with the result that the valve 65 is held in a fully open state. Conversely, when the upwardly biasing force caused by the spring 65b is less than the downwardly biasing force caused by the master-cylinder pressure PM, i.e., the master-cylinder pressure PM exceeds the pressure level PMO, the spool 65a is moved downwardly to block fluid communication between the communication passage 66 and the inlet port 5e by means of the upper land constructing the spool 65a, with the result that a maximum fluid pressure in the pressure chamber 50 is limited at the pressure level PMO.

Since the brake control system of the second embodiment employs the hydraulic pressure shut-off valve 65, the maximum spool pushing force FSM created by the solenoid 52 can be set to a minimum, thereby minimizing the size of the solenoid 52.

In the second embodiment, since compressive movement of the metal bellows 64 can effectively absorb more of brake fluid flow output from the master-cylinder, the brake control system of the second embodiment can provide an optimal feeling in depressing operation of the brake pedal, when the driver starts to depress the brake pedal.

Furthermore, since the master-cylinder pressure PM is transmitted through the metal bellows 64 to the plunger 54, the plunger 54 can be quickly moved, based on a high responsibility of the bellows 64 with respect to fluid pressure. As a result, the hydraulic pressure control valve 5 employing the metal bellows 64 provides a high responsibility for a wheel-cylinder pressure control. Moreover, since the pressure difference between the internal and external pressures with regard to the metal bellows 64 is limited at a minimum by means of the hydraulic pressure shut-off valve 65 having an extremely simple structure, a durability of the hydraulic pressure control valve 5 is enhanced.

In the preferred embodiment, although an electromagnetic proportioning solenoid is utilized as an actuator for a spool employed in an electronically controlled hydraulic pressure control valve, another type of electronically operated actuator may be utilized.

In order to derive a master-cylinder pressure, the pressure sensor may be replaced with a depressing force sensor for monitoring a depressing force of the brake pedal.

Although the brake control system according to the invention is utilized to achieve an optimal anti-skid brake control, a traction control, and a servo-assisted brake control, the brake control system may be utilized for a feedback control of a yawing rate so as to enhance vehicle turning characteristics.

While the foregoing is a description of the preferred embodiments for carrying out the invention, it will be understood that the invention is not limited to the particular embodiments shown and described herein, but that various changes and modifications may be made without departing from the scope or spirit of this invention as defined by the following claims.

What is claimed is:

1. A brake control system for automotive vehicles, comprising:
   a master cylinder for generating a master-cylinder pressure depending on a brake-pedal depressing force;
   a wheel cylinder associated with each vehicle wheel for generating braking force for said vehicle wheel;
   an external hydraulic pressure source for generating an external hydraulic pressure;
   an electronically controlled hydraulic pressure control valve connected to said external hydraulic pressure source, for converting said external hydraulic pressure to a control pressure, said hydraulic pressure control valve including a spool slidably enclosed therein for increasing said control pressure via one axial movement thereof and for decreasing said control pressure via the other axial movement thereof; and
   means for restricting the magnitude of a spool biasing force created by said master-cylinder pressure to a designated upper limit only when said master-cylinder pressure exceeds a predetermined pressure level sufficient to provide a maximum wheel-cylinder pressure.

2. The brake control system as set forth in claim 1, which further comprises a brake controller for generating a control signal depending on a vehicle driving condition, and an electromagnetic two-position solenoid valve connected to said external hydraulic pressure source and said hydraulic pressure control valve, for providing said one axial movement of said spool in response to said control signal generated during quick acceleration in the absence of said master-cylinder pressure.

3. The brake control system as set forth in claim 1, which further comprises a hydraulic pressure multiplier unit connected to said hydraulic pressure control valve for generating a wheel-cylinder pressure higher than said master-cylinder pressure by multiplying said control pressure.

4. The brake control system as set forth in claim 3, which further comprises a pilot-operated cut-off valve responsive to said control pressure output from said hydraulic pressure control valve, such that said cut-off valve is held in a closed state in the presence of said control pressure, for preventing said master-cylinder pressure from being directly supplied to said wheel cylinder and for permitting the multiplied hydraulic pressure created by said multiplier unit to be supplied to said wheel cylinder, and said cut-off valve is held in a fully open state in the absence of said control pressure, for permitting said master-cylinder pressure to be directly supplied to said wheel cylinder.

5. A brake control system for automotive vehicles, comprising:
   a master cylinder for generating a master-cylinder pressure depending on a brake-pedal depressing force;
   a wheel cylinder associated with each vehicle wheel for generating braking force for said vehicle wheel;
   an external hydraulic pressure source for generating an external hydraulic pressure;
   an electronically controlled hydraulic pressure control valve connected to said external hydraulic pressure source, for converting said external hydraulic pressure to a control pressure, said hydraulic pressure control valve including a spool slidably enclosed therein for increasing said control pressure via one axial movement thereof and for decreasing said control pressure via the other axial movement thereof, a pressure chamber receiving said master-cylinder pressure for providing said one axial movement by a spool biasing force created by said master-cylinder pressure, and an electronically operated actuator associated with said spool for providing said other axial movement; and
   means for restricting the magnitude of said spool biasing force created by said master-cylinder pressure to a designated upper limit only when said master-cylinder pressure exceeds a predetermined pressure level sufficient to provide a maximum wheel-cylinder pressure.

6. The brake control system as set forth in claim 5, wherein said restricting means includes an elastic member arranged between said spool and a plunger responsive to said master-cylinder pressure for providing said one axial movement of said spool, and includes a stopper for restricting a maximum stroke of said plunger so as to receive a portion of said spool biasing force created by said master-cylinder pressure higher than said predetermined pressure level.

7. The brake control system as set forth in claim 6, which further comprises a piston provided in said hydraulic pressure control valve, for buffering quick application of said master-cylinder pressure onto said plunger by way of an expansion of volumetric capacity of said pressure chamber, and an elastic member attached to a pressure surface of said piston facing said pressure chamber for effectively buffering said quick application of said master-cylinder pressure.

8. The brake control system as set forth in claim 5, which further comprises a hydraulic pressure multiplier unit connected to said hydraulic pressure control valve for generating a wheel-cylinder pressure higher than said master-cylinder pressure by multiplying said control pressure with a designated multiplication factor.

* * * * *